US010180177B2

(12) United States Patent
Pischinger

(10) Patent No.: US 10,180,177 B2
(45) Date of Patent: Jan. 15, 2019

(54) CENTRIFUGAL MASS ARRANGEMENT FOR THE BALANCING OF ROTATIONAL ACCELERATIONS OF AN ENGINE HOUSING

(71) Applicant: FEV GmbH, Aachen (DE)

(72) Inventor: Martin Pischinger, München (DE)

(73) Assignee: FEV GmbH, Aachen (DE)

(*) Notice: Subject to any disclaimer, the term of this patent is extended or adjusted under 35 U.S.C. 154(b) by 209 days.

(21) Appl. No.: 15/258,235

(22) Filed: Sep. 7, 2016

(65) Prior Publication Data

US 2017/0067533 A1 Mar. 9, 2017

(30) Foreign Application Priority Data

Sep. 9, 2015 (DE) ............ 10 2015 217 172

(51) Int. Cl.
*F16F 15/14* (2006.01)
*F02F 7/00* (2006.01)
*F02B 75/06* (2006.01)

(52) U.S. Cl.
CPC .......... *F16F 15/1478* (2013.01); *F02B 75/06* (2013.01)

(58) Field of Classification Search
CPC .... F16F 15/1478; F16F 15/264; F16F 15/265; F02F 7/0021; F02B 75/06
USPC ........ 123/192.1, 192.2; 74/431, 433.5, 572.2
See application file for complete search history.

(56) References Cited

U.S. PATENT DOCUMENTS

| 3,254,546 | A | | 6/1966 | Nasvytis | |
|---|---|---|---|---|---|
| 3,367,214 | A | | 2/1968 | Nasvytis | |
| 4,489,683 | A | * | 12/1984 | Tsai | F16F 15/264 123/192.1 |
| 6,388,347 | B1 | | 5/2002 | Blake et al. | |
| 6,868,815 | B2 | * | 3/2005 | Carden | B60K 6/485 123/192.2 |
| 7,077,094 | B2 | * | 7/2006 | Klotz | F01L 1/02 123/192.2 |
| 8,210,148 | B2 | * | 7/2012 | Morgan | F02B 75/06 123/192.1 |
| 8,616,172 | B2 | * | 12/2013 | Morgan | F02B 75/06 123/192.1 |

(Continued)

FOREIGN PATENT DOCUMENTS

DE 69110956 T2 4/1996

*Primary Examiner* — Grant Moubry
(74) *Attorney, Agent, or Firm* — Dinsmore & Shohl LLP

(57) ABSTRACT

The centrifugal mass arrangement for the balancing of rotational accelerations of an engine housing of a reciprocating-piston engine, such as an internal combustion engine, is equipped with a hollow cylindrical housing provided for fastening to the engine housing and has a circumferential wall with an inner side, and with a centrifugal mass carrier arranged rotatably in the housing and coupled to the drive shaft for co-rotation therewith. The centrifugal mass carrier has at least two diametrically oppositely situated ends. A roller disk with a circumferential surface is arranged on each end of the centrifugal mass carrier. Each roller disk is mounted rotatably on the respective end of the centrifugal mass carrier and is supported by the circumferential surface against the inner side of the circumferential wall of the housing and, during rotation of the centrifugal mass carrier, rolls on the inner side of the circumferential wall of the housing.

18 Claims, 3 Drawing Sheets

(56) References Cited

U.S. PATENT DOCUMENTS

| | | | |
|---|---|---|---|
| 8,845,480 B2 * | 9/2014 | Zhang | F16H 1/46 475/331 |
| 9,482,316 B2 * | 11/2016 | Kurth | F16H 1/46 |
| 9,885,399 B2 * | 2/2018 | Khosravi | F16H 1/46 |
| 2011/0009232 A1 * | 1/2011 | Kapelevich | F16H 1/46 475/331 |
| 2013/0199463 A1 * | 8/2013 | Pischinger | B60L 11/126 123/2 |

* cited by examiner

CENTRIFUGAL MASS ARRANGEMENT FOR THE BALANCING OF ROTATIONAL ACCELERATIONS OF AN ENGINE HOUSING

CROSS-REFERENCE TO RELATED APPLICATIONS

This application claims priority of German Patent Application 10 2015 217 172.8 filed Sep. 9, 2015.

FIELD OF THE INVENTION

The invention relates to a centrifugal mass arrangement for the balancing of rotational accelerations of an engine housing, which is in particular the engine housing of a reciprocating-piston engine and preferably of an internal combustion engine.

BACKGROUND OF THE INVENTION

Engine housings with their automatically rotating or moving parts, elements, units and assemblies are subjected to vibrations owing to linear and rotational accelerations. In the case of reciprocating-piston engines, it is known for the reciprocating movements to be compensated by way of balancing masses on the crankshaft and/or on balancing shafts. For example, rotating shafts of engine housings are equipped not only with balancing weights but also with flywheels. Upon the start-up of such engines with rotating shafts, the compensating movement of the housing owing to the rotational acceleration of the crankshaft is sometimes still noticeable.

SUMMARY OF THE INVENTION

It is an object of the invention to provide an improved centrifugal mass arrangement for the balancing of rotational accelerations of an engine housing.

To achieve said object, the invention proposes a centrifugal mass arrangement for the balancing of rotational accelerations of an engine housing, in particular of the engine housing of a reciprocating-piston engine, which is preferably an internal combustion engine, having
 a hollow cylindrical housing which is provided for fastening to the engine housing and which has a circumferential wall with an inner side,
 a centrifugal mass carrier which is arranged rotatably in the housing and which can be coupled to the drive shaft for co-rotation therewith,
 the centrifugal mass carrier having at least two diametrically oppositely situated ends, a roller disk with a circumferential surface being arranged on each end of the centrifugal mass carrier, and
 each roller disk being mounted rotatably on the respective end of the centrifugal mass carrier and being supported by way of the circumferential surface thereof against the inner side of the circumferential wall of the housing and, during rotation of the centrifugal mass carrier, rolling on the inner side of the circumferential wall of the housing.

Accordingly, it is provided according to the invention that, in a hollow cylindrical housing which is fixedly connected to the engine housing, there is arranged a centrifugal mass carrier which is supported on the cylindrical inner side of the circumferential wall of the housing. The centrifugal mass carrier itself is connected to the (drive) shaft which is driven by the engine, and said centrifugal mass carrier accordingly rotates together with said drive shaft in the housing of the centrifugal mass arrangement. The centrifugal mass carrier has at least two diametrically oppositely situated ends on which there is arranged in each case one centrifugal mass. Each centrifugal mass has at least one roller disk which is mounted rotatably on the respective end of the centrifugal mass carrier. The roller disk bears by way of its cylindrical circumferential surface against the cylindrical inner side of the circumferential wall of the centrifugal mass housing and rolls thereon when the centrifugal mass carrier is rotated within the housing.

It is expedient for at least two roller disks, which are fastened to a common shaft, to be arranged on each end of the centrifugal mass carrier. This increases the centrifugal mass.

The centrifugal mass arrangement according to the invention is extremely quiet in operation because the only noises generated are those from the rolling of the roller disks on the cylindrical inner side of the circumferential wall of the housing.

The greater the centrifugal forces that act on the roller disks during the rotation of the centrifugal mass carrier, the more intensely the roller disks press by way of their circumferential surfaces against the inner side of the housing circumferential wall. In this way, possible slippage between the roller disks and the housing circumferential wall is reduced. In this context, it is furthermore advantageous if the centrifugal mass carrier or the roller disks are coupled by way of a toothing to the housing circumferential wall. This advantageously prevents the occurrence of slippage. The toothing is expediently realized in that, on at least one end of the centrifugal mass carrier, there is situated a gearwheel which is coupled to the at least one roller disk and which is arranged coaxially with respect to the roller disk and which meshes with an internally toothed ring or generally with an internal toothing on the inner side of the circumferential wall of the housing. A gearwheel of said type is preferably, for the compensation of imbalances, arranged on each end of the centrifugal mass carrier. The interaction of each gearwheel with the internal toothing leads to additional running noises. These can be reduced for example through the formation of helical toothings. This is however associated with increased outlay in terms of construction and manufacturing. According to the invention, it is advantageously possible to resort to a standard toothing (that is to say without a helical toothing) because, specifically, the ideal position of the gearwheels relative to the internal toothing with regard to the generation of noise and the transmission of force can be maintained by way of the roller disks even in the presence of high rotational accelerations and rotational speeds, by virtue of the fact that the roller disks are supported on the inner side of the housing circumferential wall and thus prevent the gearwheels from being "pushed into" the internal toothing. Any radial play between the gearwheels and the internal toothing thus does not have any noise-increasing effect, or scarcely has any noise-increasing effect.

In a further advantageous embodiment of the invention, the centrifugal mass may be further increased in that, in addition to the roller disks, one or more flywheels, which co-rotate with the roller disks, are arranged on each end of the centrifugal mass carrier. The flywheels themselves do not roll on the cylindrical inner side of the housing circumferential wall, but rather rotate "freely". Improved rolling torque balancing is achieved by way of this additional centrifugal mass.

It is advantageous if the outer diameter of each centrifugal disk is greater than the outer diameter of the roller disks and/or for the mass distribution of each centrifugal disk to increase toward the outer circumference thereof. To realize the most complete possible rolling torque balancing, the diameter of the additional disks or centrifugal disks should be greater than the diameter of the roller disks. It is also advantageous if the mass distribution of the oppositely rotating parts (roller disk, gearwheels and centrifugal disks) is directed as far as possible outward, that is to say toward the circumference. This may be realized by way of geometrical shapes (for example T-shaped profile) or through the use of materials with different specific weights (for example aluminum at the inside and steel at the outside).

Thus, by way of the invention, a centrifugal mass arrangement is proposed which operates extremely quietly and which serves for the balancing of rotational accelerations and thus for reducing vibrations of an engine housing. The roller disks that are provided, according to the invention, on the ends of the centrifugal mass carrier roll on the cylindrical inner side of the housing circumferential wall with only little generation of noise, such that rotational oscillations arising from friction during the rolling movement are suppressed or dampened. It is expediently the case that, between preferably in each case two roller disks arranged on each end of the centrifugal mass carrier, there is arranged a gearwheel which is rigidly coupled either directly or indirectly to the roller disks. Here, the gearwheels mesh with an internal toothing on the circumferential wall of the housing, whereby it is advantageously the case that the main load, specifically the mean torque, can be transmitted via said gearwheels to the housing. The radial position of the gearwheels remains substantially unchanged owing to the supporting action of the roller disks which roll on the housing circumferential wall, specifically regardless of the respectively acting rotational accelerations and speeds.

BRIEF DESCRIPTION OF THE DRAWINGS

The invention will be discussed in more detail below on the basis of two exemplary embodiments and with reference to the drawing, in which, in detail.

DETAILED DESCRIPTION OF THE PREFERRED EMBODIMENTS

Figure 1:
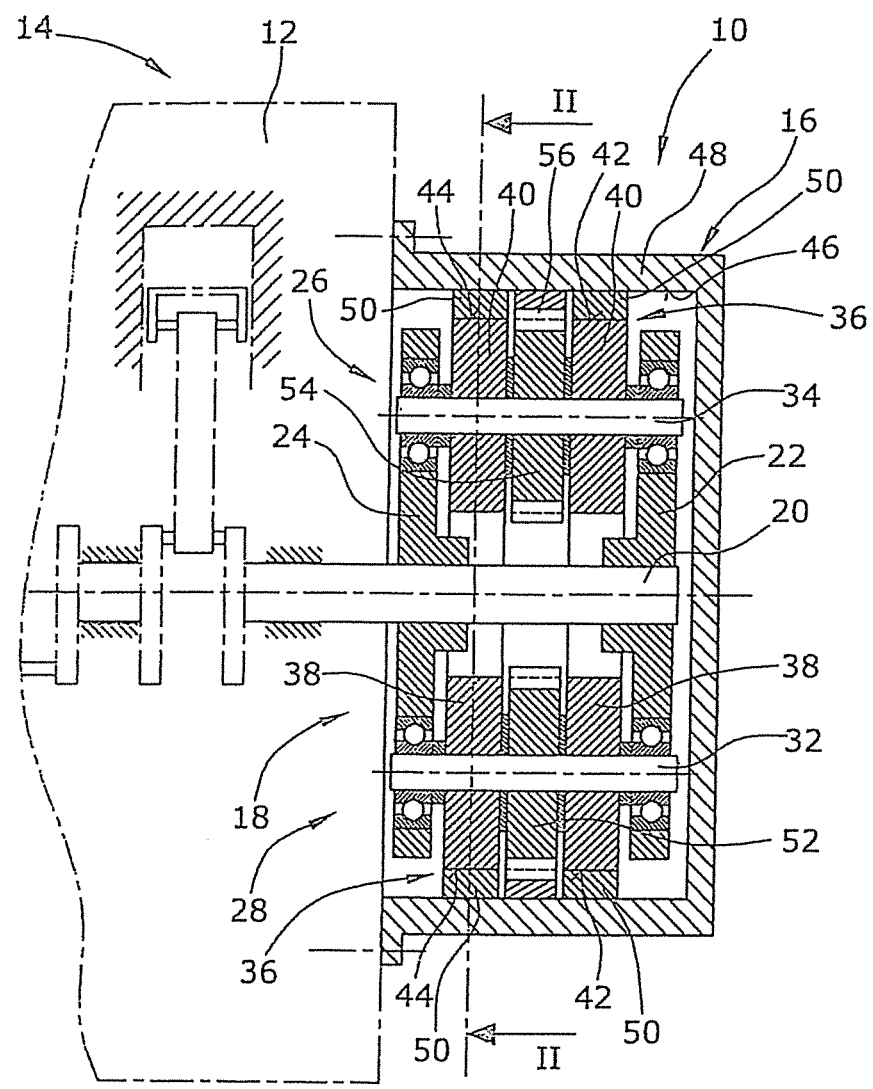
FIG. 1 shows a longitudinal section through a centrifugal mass arrangement which is fastened to the housing of a reciprocating-piston engine and which is coupled to a (drive) shaft which is driven by the reciprocating-piston engine.

The exemplary embodiments relate to a centrifugal mass arrangement for coupling to, for example, the crankshaft of a reciprocating-piston engine, which is preferably an internal combustion engine. The centrifugal mass arrangement, which is a multi-component flywheel, which may replace conventional flywheels on reciprocating-piston crankshafts, serves for the balancing of rolling torques which act on the reciprocating-piston engine. The multi-component flywheel has, in this case, a housing in which there is arranged a centrifugal mass carrier with roller disks arranged thereon at each end of the centrifugal mass carrier. The centrifugal mass carrier is fixedly connected to the crankshaft of the reciprocating-piston engine and accordingly rotates in the same rotational direction as the crankshaft. The roller disks roll on the cylindrical inner side of the flywheel housing and, in so doing, rotate in the same direction but oppositely to the direction of rotation of the centrifugal mass carrier.

Here, it is sought to realize balancing of the rolling torque in accordance with the following equation:

$$0 = \dot{\omega}_{crankshaft} \cdot J_{crankshaft} - \dot{\omega}_{centrifugal\ mass} \cdot J_{centrifugal\ mass}$$

It may furthermore be provided that an additional centrifugal mass with a balancing moment of inertia is provided. The moment of inertia $J_{centrifugal\ mass}$ preferably comprises the balancing moment of inertia, such that, by way of the additional balancing mass, the moment of inertia $J_{centrifugal\ mass}$ is increased by the balancing moment of inertia.

It is also proposed that the centrifugal mass carrier has, on its opposite ends, in each case one shaft which is rotatably mounted at the respective end. Each shaft bears a roller disk pair, wherein the two roller disks are fixedly connected to the shaft. In this way, support of the centrifugal mass carrier on the inner side of the cylindrical housing wall of the multi-component flywheel is realized over a relatively large area. This in turn is advantageous with regard to relatively high rotational accelerations and rotational speeds.

The roller disks expediently roll on an inner raceway of the inner side of the circumferential wall of the flywheel housing. The inner raceway preferably has a different material than the material of the roller disks, such that advantageous material pairings with regard to the least possible generation of noise can be used.

It is also advantageously provided that, between the two roller disks of a roller disk pair, there is arranged a gearwheel which is likewise fixedly connected to the shaft of the two roller disks.

A further refinement of the invention provides that the flywheel housing has, on its inner side, an internal toothing with which the or each gearwheel meshes.

Finally, it is also possible for the centrifugal mass carrier to have bearings for the shafts of the roller disks, wherein said bearings have a greater degree of play in a radial direction than in an axial direction. Here, owing to the fact that the roller disks are supported by way of the circumferential surfaces against the inner side of the flywheel housing, said greater radial play does not have an adverse effect.

As a bearing, use is preferably made of a plain bearing.

One application of the multi-component flywheel according to the invention may be the use thereof in a two-cylinder or three-cylinder internal combustion engine, to the driven shaft of which the multi-component flywheel is attached, wherein the flywheel housing is fixedly connected to the housing of the internal combustion engine. The multi-component flywheel according to the invention is particularly preferably used in drives of range extenders such as are sometimes used in electric vehicles. The drive units of such range extenders can, by way of the concept according to the invention, be easily configured so as to exhibit considerably improved running smoothness.

It is also possible for the rolling torque of the drive to be balanced by way of an opposing rolling torque which is coordinated with the radius of the crankshaft, the radius of a flywheel and the weight of the flywheel.

FIG. 1 shows, in longitudinal section, a centrifugal mass arrangement 10 in the form of a multi-component flywheel, wherein the centrifugal mass arrangement 10 is fixedly connected to the housing 12 of the reciprocating-piston internal combustion engine 14. The centrifugal mass arrangement 10 has a housing 16 which is for example flange-mounted onto the (engine) housing 12. In the flywheel housing 16 there is arranged a centrifugal mass carrier 18 which is fixedly connected to the crankshaft 20 of the reciprocating-piston internal combustion engine 14. The centrifugal mass carrier 18 has two carrying arms 22, 24 which are fixed, so as to be axially spaced apart from one another, to the crankshaft 20 and which extend from the crankshaft 20 to opposite sides, symmetrically with respect to said crankshaft. The two carrying arms 22, 24 are aligned with one another along the axial extent of the crankshaft 20. In each case one shaft 32 and 34 is rotatably mounted on the carrying arms 22, 24 at the respective opposite ends 26, 28 of said carrying arms, which shafts extend parallel to the crankshaft 20. The shafts 32, 34 are rotatably mounted in each case at their axial ends on the carrying arms 22, 24.

On each shaft 32 and 34 there is situated a pair 36 of roller disks, wherein each of said roller disks 38 and 40 respectively has a cylindrical circumferential surface 42 and 44 respectively which rolls on the cylindrical inner side 46 of the circumferential wall 48 of the flywheel housing 16. For this purpose, the circumferential wall 48 has inner raceways 50 which are formed by inner rings inserted into the flywheel housing 16 or directly by the inner side of the circumferential wall 48.

Figure 2:
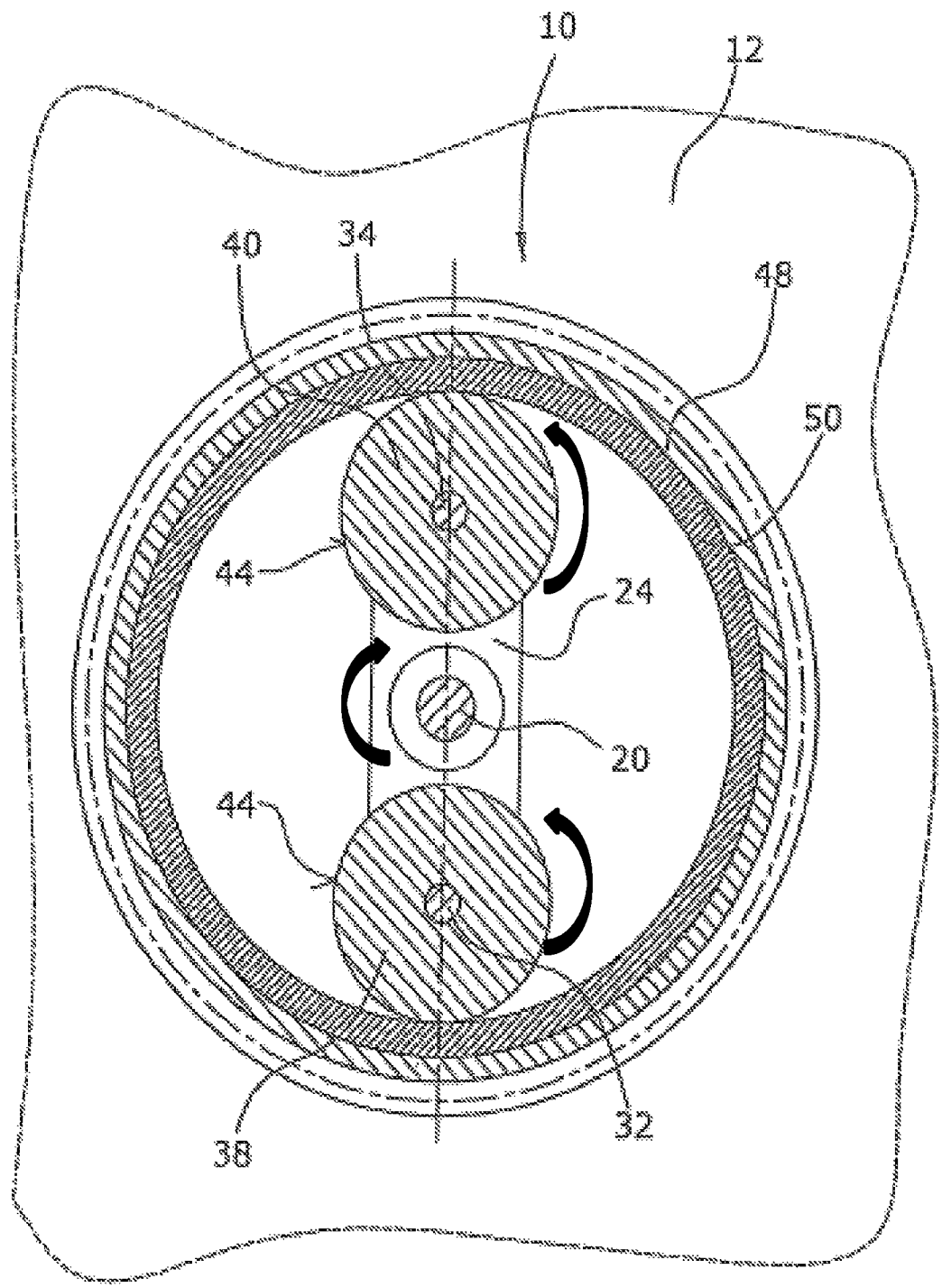
FIG. 2 shows a cross-sectional view along the plane II-II in FIG. 1 in the direction of the reciprocating-piston engine housing.

As can be derived in particular from FIG. 2, it is the case that, during the rotation of the centrifugal mass carrier 18 for example counterclockwise, the roller disks rotate in the same direction, specifically clockwise (see the different rotational direction arrows in FIG. 2).

On the respective shaft 32 and 34, between the two roller disks 38 and 40 respectively of each roller disk pair, there is situated a gearwheel 52, 54 which is fixedly connected to the respective shaft 32, 34 and which accordingly co-rotates with the roller disks 38 and 40. The pitch circle diameter (diameter of the pitch circle circumference—see the dashed lines in FIG. 1) of each gearwheel 52, 54 is in this case preferably equal to the outer diameter of the roller disks 38, 40. Between the two inner raceways 50, there is situated, on the inner side 46 of the circumferential wall 48, an encircling internal toothing 56 with which the gearwheels 52, 54 mesh.

During rotation of the crankshaft 20, the centrifugal mass carrier 18 rotates in the flywheel housing 16. Here, the roller disks 38, 40 roll on the inner raceways 50 of the flywheel housing 16. At the same time, the gearwheels 52, 54 mesh with the internal toothing 56. Here, the roller disks 38, 40 support the centrifugal mass carrier 18 against the circumferential wall 48. Thus, the roller disks 38, 40 prevent the gearwheels 52, 54 being pushed radially outward, whereby generation of noise during the meshing of the gearwheels 52, 54 with the internal toothing 56 is eliminated or reduced.

The above-described mode of operation of the multi-component flywheel and the rolling movements of the roller disks 38, 40 during the rotation of the crankshaft 20 can likewise be seen from FIG. 2. Also shown in FIG. 2 are the radii $r_1$ (inner radius of the circumferential wall 48 of the flywheel housing 16), $r_2$ (radius of the roller disks 38 and 40) and $r_3$ (spacing between the crankshaft central axis and the central axis of each shaft 32, 34). This yields the following transmission ratio i of the multi-component flywheel:

$$i = \frac{r_2}{r_3} = \frac{\omega_{centrifugal\ mass}}{\omega_{crankshaft}},$$

where $\dot{\omega}_{centrifugal\ mass}$ corresponds to the angular speed of the roller disks 38 and 40 and $\dot{\omega}_{crankshaft}$ corresponds to the angular speed of the crankshaft 20. In an advantageous refinement, the respective moments of inertia $J_{crankshaft}$ and $J_{centrifugal\ mass}$ are coordinated with one another so as to yield the following balancing condition:

$$0 = \dot{\omega}_{crankshaft} \cdot J_{crankshaft} - \dot{\omega}_{centrifugal\ mass} \cdot J_{centrifugal\ mass},$$

where $J_{centrifugal\ mass}$ corresponds to the moment of inertia of all rotating roller disk and gearwheel masses and the moment of inertia $J_{crankshaft}$ corresponds to the moment of inertia of the crankshaft 20 about the crankshaft central axis. The moment of inertia $J_{centrifugal\ mass}$ preferably comprises the respective moments of inertia of all rotatable components of the multi-component flywheel (including the carrying arms 20, 22). Said moment of inertia is preferably dimensioned as follows:

$$J_{centrifugal\ mass} = \frac{r_2}{r_3} \cdot J_{crankshaft}$$

In a further refinement, $J_{crankshaft}$ may particularly advantageously comprise the mass of all of the rotatable components of the centrifugal mass arrangement 10 as a puncti-form mass in the shafts 32, 34 which bear the roller disks 38, 40 and the gearwheels. Furthermore, $J_{centrifugal\ mass}$ may comprise only the moments of inertia of the roller disks including the gearwheels.

The adaptation of the respective moments of inertia $J_{crankshaft}$ and $J_{centrifugal\ mass}$ so as to satisfy the above balancing condition leads to balancing of the rolling torque of the overall system composed of drive and centrifugal mass arrangement.

Figure 3:
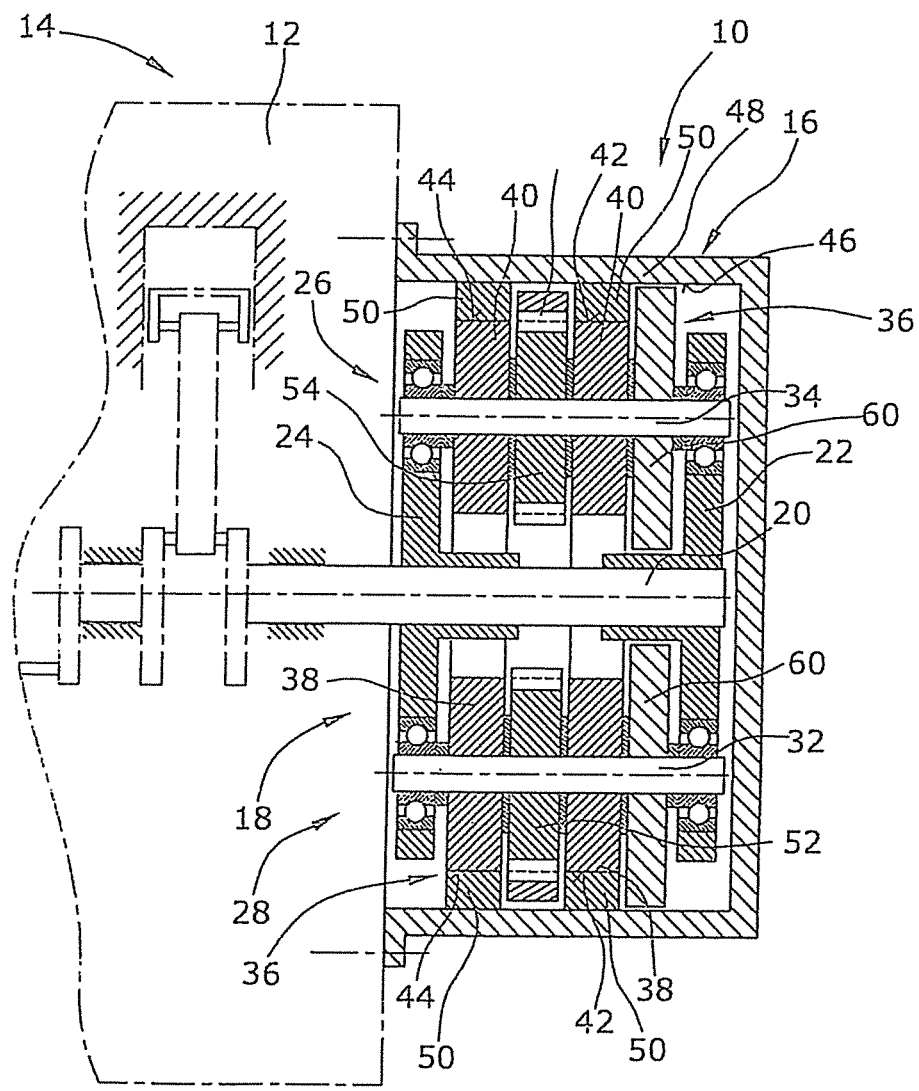
FIG. 3 shows a half-section through a centrifugal mass arrangement according to a second exemplary embodiment of the invention.

FIG. 3 shows, in a half-section, an alternative arrangement of centrifugal masses, wherein those elements in FIG. 3 which are identical in terms of construction or function to the elements in FIGS. 1 and 2 are denoted by the same reference designations in FIG. 3 as in FIGS. 1 and 2.

As can be seen, a difference between the two centrifugal mass arrangements 10 and 10' of FIGS. 1 and 2, on the one hand, and of FIG. 3, on the other hand, consists in that, in the case of the centrifugal mass arrangement 10' per FIG. 3, an additional, freely rotating centrifugal mass in the form of a centrifugal disk 60 is arranged on each shaft 32, 34. Depending on the space conditions, it is also possible for several, or thicker, centrifugal disks 60 to be arranged on each shaft 32, 34.

The invention claimed is:

1. A centrifugal mass arrangement for a balancing of rotational accelerations of an engine housing, in particular of the engine housing of a reciprocating-piston engine, which is an internal combustion engine, comprising
   a hollow cylindrical housing adapted to fasten to the engine housing, the hollow cylindrical housing having a circumferential wall with an inner side, the circumferential wall having an inner raceway, the inner raceway having a smooth inner and outer surface, the smooth outer surface abuts the inner side of the circumferential wall,
   a centrifugal mass carrier which is arranged rotatably in the hollow cylindrical housing and which is coupled to a drive shaft for co-rotation therewith,
   the centrifugal mass carrier having at least two diametrically oppositely situated ends,
   a roller disk with a circumferential surface being arranged on each end of the centrifugal mass carrier, and
   each roller disk being mounted rotatably on a respective end of the centrifugal mass carrier and being supported by way of the circumferential surface thereof against the inner raceway of the circumferential wall of the hollow cylindrical housing and, during rotation of the centrifugal mass carrier, rolling on the smooth inner surface of the inner raceway of the hollow cylindrical housing.

2. The centrifugal mass arrangement as claimed in claim 1, wherein, to at least one or to each roller disk, there is coupled, for co-rotation with the roller disk, a gearwheel which is arranged coaxially with respect to said roller disk, wherein an internally toothed ring is arranged on the inner side of the circumferential wall of the hollow cylindrical housing, and wherein the gearwheel or the gearwheels mesh(es) with the internally toothed ring.

3. The centrifugal mass arrangement as claimed in claim 2, wherein a diameter of each of the roller disks is equal to a pitch circle diameter of the gearwheel or of the gearwheels.

4. The centrifugal mass arrangement of claim 1, wherein, on each end of the centrifugal mass carrier, there is mounted one pair of coaxially arranged roller disks which are supported by way of their respective circumferential surface on the smooth inner surface of the inner raceway of the hollow cylindrical housing and which, during rotation of the centrifugal mass carrier, roll on the smooth inner surface of the inner raceway of the hollow cylindrical housing.

5. The centrifugal mass arrangement of claim 4, wherein, between the two roller disks of each roller disk pair, there is arranged a gearwheel which is coaxial with respect thereto and which is coupled to the respective roller disks for co-rotation therewith.

6. The centrifugal mass arrangement as claimed in claim 1, wherein, to each roller disk or to each roller disk pair, there is coupled at least one centrifugal mass-increasing centrifugal disk which, during the rolling of the respective roller disk or during the rolling of the roller disks of the respective roller disk pair, rotates freely therewith.

7. The centrifugal mass arrangement as claimed in claim 6, wherein an outer diameter of each centrifugal disk is greater than an outer diameter of the roller disks, and/or wherein a mass distribution of each centrifugal disk increases toward an outer circumference thereof.

8. A centrifugal mass arrangement for a balancing of rotational accelerations of an engine housing, in particular of the engine housing of a reciprocating-piston engine, which is an internal combustion engine, comprising
a hollow cylindrical housing adapted to fasten to the engine housing, the hollow cylindrical housing having a circumferential wall with an inner side,
a centrifugal mass carrier which is arranged rotatably in the hollow cylindrical housing and which is coupled to a drive shaft for co-rotation therewith,
the centrifugal mass carrier having at least two diametrically oppositely situated ends,
a roller disk with a circumferential surface being arranged on each end of the centrifugal mass carrier,
each roller disk being mounted rotatably on a respective end of the centrifugal mass carrier and being supported by way of the circumferential surface thereof against the inner side of the circumferential wall of the hollow cylindrical housing and, during rotation of the centrifugal mass carrier, rolling inner side of the circumferential wall of the hollow cylindrical housing, and
at least one or to each roller disk, there is coupled, for co-rotation with the roller disk, a gearwheel which is arranged coaxially with respect to said roller disk, wherein an internally toothed ring is arranged on the inner side of the circumferential wall of the hollow cylindrical housing, and wherein the gearwheel or the gearwheels mesh(es) with the internally toothed ring.

9. The centrifugal mass arrangement as claimed in claim 8, wherein a diameter of each of the roller disks is equal to a pitch circle diameter of the gearwheel or of the gearwheels.

10. The centrifugal mass arrangement of claim 8, wherein, on each end of the centrifugal mass carrier, there is mounted one pair of coaxially arranged roller disks which are supported by way of their respective circumferential surface on the inner side of the circumferential wall of the hollow cylindrical housing and which, during rotation of the centrifugal mass carrier, roll on the inner side of the circumferential wall of the hollow cylindrical housing.

11. The centrifugal mass arrangement of claim 10, wherein, between the two roller disks of each roller disk pair, there is arranged a gearwheel which is coaxial with respect thereto and which is coupled to the respective roller disks for co-rotation therewith.

12. The centrifugal mass arrangement as claimed in claim 8, wherein, to each roller disk or to each roller disk pair, there is coupled at least one centrifugal mass-increasing centrifugal disk which, during the rolling of the respective roller disk or during the rolling of the roller disks of the respective roller disk pair, rotates freely therewith.

13. The centrifugal mass arrangement as claimed in claim 12, wherein an outer diameter of each centrifugal disk is greater than an outer diameter of the roller disks, and/or wherein a mass distribution of each centrifugal disk increases toward an outer circumference thereof.

14. A centrifugal mass arrangement for a balancing of rotational accelerations of an engine housing, in particular of the engine housing of a reciprocating-piston engine, which is an internal combustion engine, comprising
a hollow cylindrical housing adapted to fasten to the engine housing, the hollow cylindrical housing having a circumferential wall with an inner side,
a centrifugal mass carrier which is arranged rotatably in the hollow cylindrical housing and which is coupled to a drive shaft for co-rotation therewith,
the centrifugal mass carrier having at least two diametrically oppositely situated ends,
a roller disk with a circumferential surface being arranged on each end of the centrifugal mass carrier,
each roller disk being mounted rotatably on a respective end of the centrifugal mass carrier and being supported by way of the circumferential surface thereof against the inner side of the circumferential wall of the hollow cylindrical housing and, during rotation of the centrifugal mass carrier, rolling inner side of the circumferential wall of the hollow cylindrical housing,
at least one or to each roller disk, there is coupled, for co-rotation with the roller disk, a gearwheel which is arranged coaxially with respect to said roller disk, wherein an internally toothed ring is arranged on the inner side of the circumferential wall of the hollow cylindrical housing, and wherein the gearwheel or the gearwheels mesh(es) with the internally toothed ring, and
a diameter of each of the roller disks is equal to a pitch circle diameter of the gearwheel or of the gearwheels.

15. The centrifugal mass arrangement of claim 14, wherein, on each end of the centrifugal mass carrier, there is mounted one pair of coaxially arranged roller disks which are supported by way of their respective circumferential surface on the inner side of the circumferential wall of the hollow cylindrical housing and which, during rotation of the centrifugal mass carrier, roll on the inner side of the circumferential wall of the hollow cylindrical housing.

16. The centrifugal mass arrangement of claim 15, wherein, between the two roller disks of each roller disk pair, there is arranged a gearwheel which is coaxial with respect thereto and which is coupled to the respective roller disks for co-rotation therewith.

17. The centrifugal mass arrangement as claimed in claim 14, wherein, to each roller disk or to each roller disk pair, there is coupled at least one centrifugal mass-increasing centrifugal disk which, during the rolling of the respective roller disk or during the rolling of the roller disks of the respective roller disk pair, rotates freely therewith.

18. The centrifugal mass arrangement as claimed in claim 17, wherein an outer diameter of each centrifugal disk is greater than an outer diameter of the roller disks, and/or wherein a mass distribution of each centrifugal disk increases toward an outer circumference thereof.

* * * * *